United States Patent [19]

Nicholas

[11] 3,763,433

[45] Oct. 2, 1973

[54] SYSTEM AND METHOD FOR DIFFERENTIAL PULSE CODE MODULATION OF ANALOG SIGNALS

[75] Inventor: David C. Nicholas, Cedar Rapids, Iowa

[73] Assignee: Iowa State University Research Foundation, Inc., Ames, Iowa

[22] Filed: Jan. 13, 1972

[21] Appl. No.: 217,611

[52] U.S. Cl......... 325/38 B, 332/11 D, 340/347 DD

[51] Int. Cl. ............................................ H04b 1/66

[58] Field of Search ................ 325/38 R, 38 B, 321; 179/15 AP, 15 BW; 332/11 D; 329/104; 340/347 DD

[56] References Cited

UNITED STATES PATENTS

| | | | |
|---|---|---|---|
| 3,652,957 | 3/1972 | Goodman | 325/38 B |
| 3,526,855 | 9/1970 | McDonald | 332/11 D |
| 3,596,267 | 7/1971 | Goodman | 340/347 DD |
| 3,372,237 | 3/1968 | Hackett | 179/15 BW |
| 3,579,108 | 5/1971 | Cutler | 179/15 AP |

*Primary Examiner*—Charles D. Miller
*Attorney*—James J. Hill

[57] ABSTRACT

A system for differential pulse code modulation includes a delta modulator receiving an input analog signal. The output data stream of the delta modulator is compressed by grouping it into sequential sets of predetermined size, and a binary code word is generated representative of the number of ONES in each set. This binary code word may be transmitted or the quantity of data to be transmitted may be further reduced according to either of two techniques that are disclosed. In one embodiment, the receiver decodes the transmitted data by determining the number of ONES in each original set according to the received binary code word, and then generates a new set at the receiver similar to the original set in that it has the same number of ONES and ZEROS as the original set, but they occur in a preassigned order that may be different than the order of the original set. The resulting bit stream is then converted to analog form by a delta demodulator.

1 Claim, 3 Drawing Figures

SYSTEM AND METHOD FOR DIFFERENTIAL PULSE CODE MODULATION OF ANALOG SIGNALS

BACKGROUND AND SUMMARY

The present invention relates to a system and method for differential pulse code modulation of analog signals wherein it is desired to transmit data in digital rather than analog form. Because of apparently inconsistent use in the literature of the various terms for different kinds of pulse code modulation, it is felt that a better understanding will be had of the present invention if considerable background information is given.

Pulse code modulation is a method of transmission analog signals in digital form. In a simple pulse code modulation system, a quantizer and an analog to digital converter samples an incoming analog signal at predetermined times and generates a digital signal representative of the analog signal at the sampling time. The digital signal is then transmitted over the channel and converted back to an analog signal at the receiver. Such systems have become more and more common because they permit a number of separate systems to simultaneously use a common transmission line through time-sharing techniques. One such system in common usage is the American Telephone and Telegraph T–1 carrier system. In this system the bandwidth of the speech signal is limited to 3.5 KHz. The sampling rate is 8 KHz, and samples are made with 7 bits of precision ($2^7 = 128$ levels). The result is a basic data rate of 56,000 bits per second to which additional control information is added. "Companding" refers to the compression of the transmitted signal and subsequent expansion of the received signal. Companding is usually accomplished by analog means prior to digitizing at the transmitter or after reconversion to analog form at the receiver. In other systems, compression and expansion are performed on the digital data.

Pulse code modulation systems of the type described above are based on the sampling theorem which states that a band limited analog signal may be reconstructed without error from exact, discrete samples of the original signal provided that the sampling rate is at least twice the bandwidth. Further, these systems depend only on the sampling theorem and would work well on signals which have the characteristics of band-limited white noise. Most signals of interest do not have the characteristic of white noise. Speech, for example, carries most of its energy at frequencies considerably below 3.5 KHz. Such signals are predictable to some extent, and this predictability can be used to obtain systems yielding performance superior to conventional pulse code modulation.

For example, speech is a slowly changing wave form with respect to an 8 KHz sampling rate. A reasonable prediction, then, in the absence of further information, is that the next sample will be the same as the last. A simple intergrator may be used to perform that prediction, but more sophisticated predictors requiring more complex circuits can also be made.

Differential pulse code modulation systems transmit the quantized difference between the actual input and the reconstructed input at the previous sample which in simple systems predicting no change is, of course, also the predicted value. The receiver is provided with a predictor as well as the transmitter, and it recovers the original input subject to quantizaton error by decoding the received signal and adding the predicted value which had been subtracted at the transmitter. The net effect of substracting the predicted value from the input results in a smoother difference. This smooth signal may be quantized with less precision and still yield results equivalent to a conventional pulse code modulation system for the same sampling rate. Less precise samples at the same sampling rate yield, in effect, a lower data transmission rate. Conversely, samples of identical precision and the same sampling rate will yield superior system performance.

Delta modulation is a special case of differential pulse code modulation, and it transmits pulses of only two possible states representative only of the algebraic sign of the sampled difference. That is, the samples may be thought of as having a one bit precision.

There apparently has been some confusion in the literature as to what is meant by "differential pulse code modulation" and "delta modulation" or "delta pulse code modulation," but as used herein, the terms are intended as explained above. That is, differential pulse code modulation is a more generic term covering systems for transmitting a plurality of binary digits representative of the change in amplitude of an input analog signal for a single sampling period; whereas delta modulation or delta pulse code modulation are synonymous terms referring to the restricted case of differential pulse code modulation wherein only a single binary pulse is transmitted for each sampling interval, and one binary state represents that the sampled input wave form has increased relative to the predicted value (that is, the amplitude at the last sampling period) and the other binary state represents that the incoming wave form has decreased relative to the predicted value.

The great advantage of delta modulation is the simplicity of the system circuitry. For example, a comparator circuit receiving at one input the analog input signal and at the other input the integrated output can serve to make the basic decision of whether or not the transmitted pulse should be a ONE or ZERO. The output of the comparator is then fed to one input of a triggerable flip-flop circuit and the output of the comparator is also inverted and connected to the other input of the flip-flop circuit. A clock pulse is connected to the trigger input of the flip-flop circuit and serves as the sample rate generator. The comparator and flip-flop serve as a digital "sample and hold" circuit with one bit of precision—namely the algebraic sign bit. The output of the flip-flop circuit may be transmitted to the receiver as well as coupled to the input of an integrator circuit serving as the predictor in the transmitter, the output of the integrator being connected to the negative input of the comparator circuit. Detection at the receiver involves principally the function of integrating the received bits. Additional information about delta modulators, including a more complete description of the foregoing simple delta modulator, may be found in my Doctoral Thesis entitled "Source Codes for the Output of a Delta Modulator Operating on Speech," Iowa State University, Ames, Iowa, 1971.

Although it affords such advantages as simplicity, there are attendant disadvantages to using a simple delta modulation system. These disadvantages are reflected principally in errors that may be introduced as a result of this type of modulation. The first type of error is referred to as "slope overload distortion" and it occurs when the input analog signal is changing too rapidly for the delta modulator to respond. That is, the step size of the delta modulator is limited to a predetermined value, and if the input analog waveform change is greater than that value between sampling periods, the system cannot respond so that the slope of the received signal over time is not as great as the slope of the input analog signal. The second type of distortion is referred to as "granular distortion," and it occurs when the input analog signal has a negligible input change relative to the step size of the binary signal transmitted by the delta modulator. That is, in trying to reproduce the input analog signal, the receiver introduces an overriding square wave or triangular wave pattern, depending on whether or not it is a wide pulse or narrow pulse system, because the step size is too large. One solution to this problem is to use a smaller step size in the transmitter together with a much higher sampling rate. A more desirable solution is to use a more general differential pulse code modulation scheme with more than one step size. This is referred to as multi-level quantization. Heretofore, as already mentioned, such multi-level quantizers are more expensive than simple delta modulators. They are also more difficult to maintain and adjust. Thus, the principal object of the present invention is to achieve multi-level quantization of an input analog waveform while using a simple delta modulator to perform the quantizing. In its broader aspects, then, the present invention uses a delta modulator for receiving an input analog signal. The output data stream of the delta modulator is transformed or "mapped" by grouping it into sequential sets of predetermined size. As used in this context, "size" refers to the number of bits (ONES and ZEROS) in a word. A binary code is then generated representing only the number of ONES in each set. This binary code word may then be transmitted to the receiver as a multi-level representation of the net change in the input analog signal over a longer sampling period which is determined by the number of samples in the predetermined sets.

I have discovered that in transmitting speech signals encoded according to this technique, there is a surprisingly good recovery of the information in the speech while using a very simple system. Moreover, the result is equivalent to multi-level differential pulse code modulation, and the advantages of that system are well known.

The sampling rate of the delta modulator can be much higher than the transmission rate; and it can thus be made to generate as good a representation of the input as is desired. Hence, the multi-level quantization of the incoming analog signal obtained from the output of the underlying delta modulator can be as good as is desired with a minimum of slope overload distortion. Further, the same number of bits in each of the sets may be re-introduced by the receiver and in a preassigned sequence. For example, if the output bits of the delta modulator at the transmitter are grouped into sets of 31, and the ONES counted, the number of possible ONES may be coded into 5 bits (representing $2^5$ possible counts). Thus, only 5 bits are transmitted as a representation of the 31 samples taken by the delta modulator.

The receiver translates the received 5 bits back into a 31-bit sequence wherein the same number of ONES are generated, but in an arbitrary, pre-assigned order. Thus, the net increase or decrease in amplitude for the original 31-bit time interval (sometimes herein referred to as the "set" or "group" sampling period) is preserved, but the exact path taken from the input voltage at the beginning of the set sampling period to the end of the set sampling period is lost because only the number and not the sequence of ONES and ZEROS is preserved. I have discovered that, particularly in the transmission of speech, the particular path that the input analog signal takes between these two points (the part that is lost) is not as important as the net change in amplitude between these two points (the information that is retained). Speech that is transmitted after being encoded and decoded according to the present technique is easily understood at the receiver even in simple systems.

Further, the encoding and transmission method of the present invention lends itself to even further compression. One such method of further compression would be to base the available coded transmission levels in a non-linear fashion, such as the logarithmic technique suggested in the U. S. Pat. No. 3,151,296 of Phyfe, issued Sept. 29, 1964. In this scheme, levels of the transmission code for the smaller difference voltages are spaced apart at smaller distances. That is to say, the smaller differences are encoded into the transmission code with a much higher accuracy. Such a scheme is mechanized in my system by assigning more than one count number of the binary ONES emanating from the delta modulator during a group sampling period to a single transmission code. For example, the count subsets of ONES 23 through 31 for an increasing or positive difference may be assigned a single transmission code. In this manner, the original 32 possible count subsets may be encoded in 3 bits of transmitted data. No ONES and 31 ZEROS corresponds to minus 31, one ONE and 30 ZEROS corresponds to minus 30 plus 1 (i.e. minus 29), two ONES corresponds to minus 27, . . . , 30 ONES and one ZERO corresponds to plus 29, 31 ONES and no ZEROS corresponds to plus 31. Thus, large steps can be provided to minimize slope overload, and small steps can be provided to minimize granular distortion. By thus providing quantization levels which are not uniformly spaced, the principal advantages of differential pulse code modulation are achieved in a system employing a delta modulator. Therefore, the best features of each type of system may be incorporated into a single system.

The second alternative for further compression of the data is to further group the counts of ONES into larger sets which bear a linear relationship to the actual count. For example, a count of no ONES and a single ONE may be grouped together and transmitted as a single count. A count of two ONES and three ONES may be similarly grouped together and transmitted, and so on. Thus, the transmitted values may be counts of one, three, four, etc., binary ONES. This does not result in true differential pulse code modulation because the end points of the analog outputs at the count sampling times are not always the same. Correction is made by keeping track of the net count transmitted and then making a correction when possible. For example, consider that counts of five ONES and four ONES are grouped together and a sequence of counts 5, 5, 5 occurs. The first five may be transmitted as a four, resulting in a one-step error between transmitter and receiver at the end of the counter interval. However, the transmitter keeps track of the difference so that the next five is transmitted as a six, rather than a four. The system once again becomes equivalent to differential pulse mode modulation because the approximate difference between the input to the system and the signal generated at the receiver will eventually become equal, and in any case, will never differ by a preassigned value.

The present invention, in summary, is directed to pulse code modulation of analog signals wherein the final digital representation of the analog signal is obtained in a process including first feeding the input analog signal to a delta modulator to generate a stream of bits wherein each bit is representative of whether the input analog signal at a particular sampling time has gone positive or negative with respect to its value at a previous sampling time. A digital transformation is then performed on the output of the delta modulator by grouping the output bits into sets of words of predetermined number and transforming the delta modulator output words into a new digital representation having a lesser number of signals per unit time, thereby producing efficiency for transmission of the reduced number of bits.

The final digital representation, in one instance, may be thought of as equivalent to multi-level differential pulse code modulation. Using prior techniques, one would perform the transformation from analog signal to multi-level differential pulse code representation in a single step. The process described in the present invention is advantageous for several reasons, as will be explained in greater detail within. Briefly, however, the principal advantages accruing from the present invention include the significant saving of hardware costs because the single step approach requires a large number of components, the accuracy of which is critical, while in the present method, a number of critical components is reduced to a minimum. One form of differential pulse code modulation is referred to as "companded" differential pulse code modulation, and it is perhaps the most useful. Such a representation is obtained as a special case of the digital transformation step of the present invention.

It will be realized, therefore, that the present invention permits the transmission of data in a code which is equivalent to differential pulse code modulation having a multiplicity of levels (as represented by the code of the transmitted word) while permitting use of the simplified equipment of a delta modulator and demodulator.

Other features and advantages of the present invention will be apparent to persons skilled in the art from the following detailed description of a preferred embodiment accompanied by the attached drawing.

THE DRAWING

DETAILED DESCRIPTION

Figure 1:
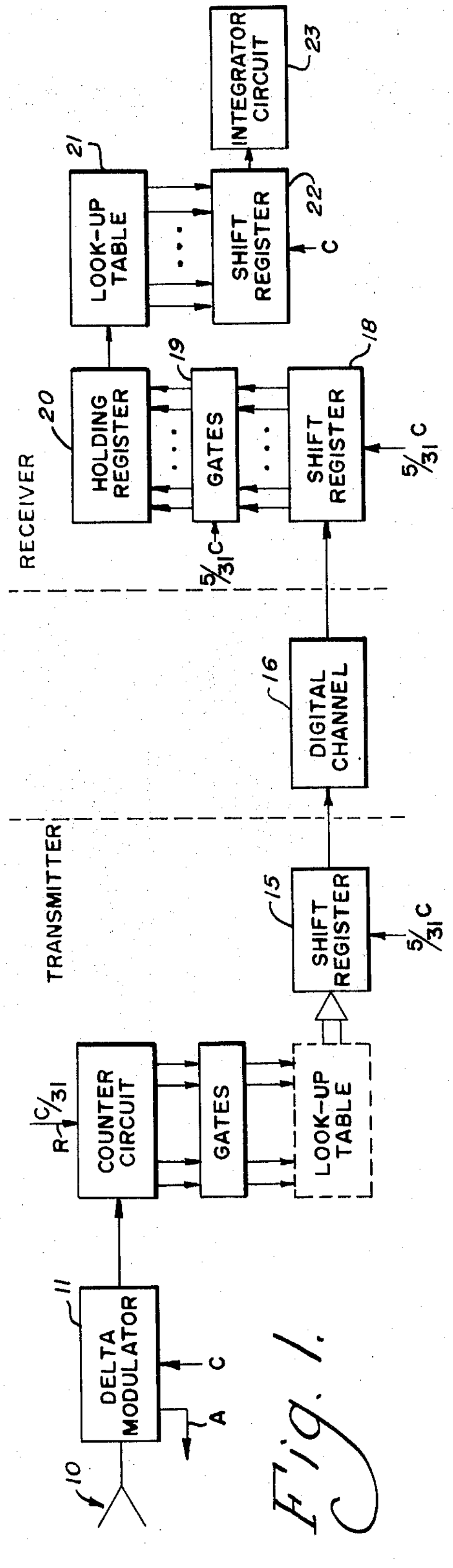
FIG. 1 is a functional block diagram of a system according to the present invention.

Referring first to FIG. 1, an input analog signal is received via the input schematically indicated by reference numeral 10, and it is fed to a delta modulator represented by the functional block 11. The delta modulator 11 may be of any well-known construction, including the one previously discussed and functionally shown in FIG. 3 wherein a difference amplifier 11*a* forms a summing junction receiving the input signal and the output of an integrator circuit 11*b*, the input of which is the output of the delta modulator. The output of the summing junction is fed to a two level quantizer sample and hold circuit 11*c*, the output of which is a bit stream at the clock rate C wherein each bit represents whether the input signal has gone positive or negative since the last sample. A simple integrator 11*b* may be used to demodulate. The predicted value at the transmitter is the output of integrator 11*b*, designated A.

The delta modulator 11 receives an input analog signal and at predetermined time intervals, indicated by the clock input C, samples the input waveform and generates a stream of periodically occurring output pulses along a line 12. The output pulses are capable of existing in only one of two predetermined voltages, for example, plus or minus 5 volts—that is, the two states are normally symmetrical with respect to ground. Each pulse or level at a clock time is indicative of whether the input waveform at the sampling time is respectively greater than or less than the input waveform at the previous clock time—that is, the "predicted value." As has already been mentioned, the most easily mechanized predicted value for speech is that the incoming waveform will be equal to the value it had assumed at a previous clock time. Other applications could be envisioned wherein the predicted value would bear some other relationship to the incoming analog signal.

The output pulses emanating from the delta modulator 11 are fed sequentially into a counter circuit 13 which also may be conventional, for example, a plurality of flip-flop circuits arranged to count in binary notation the incoming pulses. For example, the counter circuit 13 may be designed to count the ONES in the incoming stream of pulses. It will be realized that the logic designation ONES may equally well be interchanged with the designation ZEROS, each designation indicating one exclusive state in a binary logic system. In order to better understand the present invention, a specific example will be assumed. It will be supposed that it is desired to compress 31-bit groups emanating from the delta modulator 11 down to 5 bits for transmission. Hence, at the end of the 31st clock pulse, the parallel outputs of the counter circuit 13 are transmitted via gate circuits 14 into the parallel inputs of a shift register 15. At this time, the counter circuit 13 is reset via the reset lead R, and it is free then to count the ONES in the next set of 31 bits from the delta modulator 11. During this second counting time, the count from the previous set is stored in the shift register 15, and this count may be transmitted directly to the digital channel 16 at the clock rate equal to 5/31 C.

It will be realized that the contents of the shift register 15 is a binary code representative of the number of ONES in a set of bits emanating from the delta modulator 11. The count, of course, is not indicative of the sequence in which the ONES occurred, but it is representative of the net change in magnitude of the input waveform at the end of each set of 31 samples. The transmission rate through the digital channel 16 is five thirty-firsts of the sampling rate. This binary code in the shift register 15 may be thought of as a multi-level quantization (that is, true differential pulse code modulation) of the incoming analog waveform.

The contents of the shift register 15 may be further compressed, if desired, in a manner similar to that disclosed in the above-mentioned U. S. Pat. No. 3,151,296, by assigning a code on a logarithmic basis to the binary word in the shift register 15 that is actually being transmitted. This would be accomplished by feeding the word into a look-up table 17 prior to transfer to shift register 15. In the look-up table 17, a second code, of a still small number of bits, is assigned to the 5-bit word in the counter 13 prior to transmission. In this compression process more than one 5-bit count will in some cases be assigned to the same transmitted code word.

In the receiver, a shift register 18 receives the sequential bits of the word transmitted from the shift register 15, and the contents of the shift register 18 are transmitted in parallel through gates 19 to a holding register 20 which may be a conventional shift register. A clock signal must be generated at the receiver which is synchronized with the clock at the transmitter, and this may be accomplished according to any number of well-known techniques currently used for synchronizing such clocks. The output of the holding register 20 is fed to a look-up table 21 in the receiver which turns the 5-bit received word back into a 31-bit word which is transferred to another shift register 22 in parallel. Thus, the shift register 22 holds a pre-assigned set of 31 bits having the same number of ones as the originally encoded word, but wherein the sequential location of the ONES and ZEROS has a pre-assigned value which does not bear any particular relationship to the order in which the ONES were generated by the delta modulator 11 for that 31-bit word.

The signals in the shift register 22 are then clocked at the clock rate C in sequential order into an integrator circuit 23, the output of which is the re-constructed input wave form. It will be observed that the output of the integrator circuit 23 will match the input to the delta modulator 11 for each encoded word in a precise manner at the end of each 31st clock pulse; but it does not necessarily match the input waveform for intervening clock pulses. The quality of the approximation depends upon the quality of the delta modulation.

I have tried the encoding and decoding scheme outlined above, the binary serial output of the delta modulator 11 was grouped into 7-bit words, and the number of ONES in each word was counted. There are eight possibilities (0 through 7). The number of ONES in each word can therefore be transmitted using 3 bits instead of 7. Thus, the word 0000000 is transmitted as 000; the code 001 is transmitted for all possible combinations in which only a single ONE is detected in the counter circuit 13 (i.e., 1000000, 0100000, 0010000, etc.). Similar binary code transmission words are selected for words with combinations of two ONES in each set of 7 bits emanating from the delta modulator 11, another code is selected for any combination of three ONES in 7 bits, etc.

The receiver selects a pre-assigned 7-bit sequence for each received 3-bit binary code transmission word. The seventuple all ZEROS is used by the demodulator when 000 is received; 0001000 is supplied whenever 001 is received. The delta modulator is run at 50 kbps (kilobits per second); hence, the effective data transmission rate after recording is 21.4 kpbs. As mentioned, the output of the demodulator at the end of each 7-bit sequence must be the same as it would have been if the source sequence had been used, because the sequence actually used has the same number of ONES (and hence, ZEROS). The waveform at the output, however, takes a preassigned path which may possibly be different from the path between the two points taken by the input waveform. The error is committed by taking the same path from endpoint to endpoint for any word with the same number of ONES rather than the path indicated by the pattern of incoming ONES.

At a 50 kpbs rate, the output of the demodulator matches the correct output even 7 bits, which is every 140 microseconds. It may be said that the correct output is matched at 7.1 KHz. It is reasonable to suppose that much of the noise in speech introduced by an error in a path this short would be out of the voice band which is usually about 3.5 KHz.

The following eight words were used by the receiver: 0000000, 000;000, 0100010, 0101010, 1010101, 1011101, 1110111, and 1111111. Each of the 128 input words was assigned to one of the eight words indicated above according to its number of ONES by a simple table look-up. Each of the eight 7-bit words above was assigned a unique 3-bit word for transmission, which advantageously reduces the data rate required for the channel. The result was described as surprisingly good by several listeners, although there appeared to be some increase in the background noise level of the output during speech.

The relationship between the transmission of a binary code representative of the number of ONES in sets of bits resulting from delta modulation of an input analog signal has already been indicated. However, it is believed that the following example will make this relationship even more clear. The delta modulator produces a train of digital output signals which, after transmission, are integrated at the receiver to generate an approximation of the incoming analog signal at the transmitter. The output of the delta modulator may also be integrated at the transmitter, thus resulting in the above-mentioned prediction signal. This prediction signal is sometimes referred to as the analog output of the delta modulator, previously indicated as A. The analog outut, available both at the transmitter and receiver, is the approximation which a delta modulator makes of the incoming analog signal.

By counting the number of ONES (or, transversely ZEROS), the delta modulator system of the present invention transmits signals representative of multi-level differential pulse code modulation of the analog output of the delta modulator, the multi-level samples being taken at a rate equal to the sampling rate of the delta modulator divided by the number of bits in a set (sometimes referred to as the group sampling rate). The actual transmitted data rate is then the group sampling rate times the number of bits required to define uniquely each group of counts. The result is, in turn, an approximation to differential pulse code modulation of the analog input to the delta modulator, and exact differential pulse code modulation of the analog output of the delta modulator. The quality of the approximation depends on the quality of the delta modulation. This is demonstrated in the above explanation wherein 7-bit words from the delta modulator were encoded in three binary digits (the transmitted word). Seven ONES emanating from the delta modulator indicates a net change in the analog output of seven positive steps. Six ONES and one ZERO indicates a net change of five positive steps. The other relations are five ONES (net positive three steps); four ONES (net positive one step); three ONES (net negative single step); two ONES (net negative three steps); net one step (net negative five steps); and no ONES (net negative seven steps). Thus, the net change in the analog output of the delta modulator is transmitted every 7th-bit time or at the group sampling rate. This is what a differential pulse code modulation system would do if it had steps of ± 7, ± 5, ± 3, and ± 1; and it operated at a sampling rate of exactly one-seventh of the delta modulator clock rate—that is, at the output word rate. The analog output always falls exactly on one of the steps so that the differential pulse code modulation of the analog output of the delta modulator is free of errors.

In using the present invention to obtain multi-level differential pulse code modulation, it is desirable to effect high-quality delta modulation to increase the accuracy of the approximation. This is accomplished by using a small step and a high clock rate in the delta modulator. This high sampling rate of the delta modulator is not a serious restriction because, due to the compression of the output stream of the delta modulator, the actual transmission rate is reduced. The serial output of the delta modulator is divided into output words which are as long as the sampling period of the differential pulse code modulation system being implemented. Finally, it may be desirable to divide the set of all possible counts into subsets of non-uniform size and to assign a nominal value to each subset; a "companded" differential pulse code modulation system is implemented in that fashion.

Suppose it is desired to implement a differential pulse code modulation system with step sizes of ± 1, ± 3, ± 9 and ± 21. The maximum step size permitted in the delta modulator is one unit. Suppose further that 31 bits per differential pulse code modulation sampling period are required in order to yield high-quality delta modulation. The resulting groupings of counts of ONES in the 31-bit word are shown in table 1 below along with the range of net changes which they represent. The counts corresponding to the specific step sizes are underlined. That is to say, considering the first count subset, an output code (that is, the code transmitted through the digital channel) of 111 is assigned to the count subset including 23 ONES through 31 ONES. The count subset 26 is underlined as representing a net change of plus 21 units, meaning that for any count word registering a count of 26 (that is, 26 positive increments), there were also five ZEROS, indicating five negative increments. The net change is thus 21 which is the highest increment of change for the transmitted differential pulse code modulation scheme. It will be observed that the count subsets assigned to individual output codes is non-linear, the smaller number of counts being assigned to the smallest net changes (plus 1, minus 1 ). An assignment of count subsets of this type will minimize granular distortion in the system while, at the same time, minimizing slope overload because of the ability of the system to respond to the larger net increases and decreases. With a system of this type, a differential pulse code sampling rate (that is, output word rate) of 10 KHz would be achieved by operating a delta modulator at 310 KHz.

| Count Subsets | Change Range | Net Change | Output Code |
|---|---|---|---|
| 31, 26, 23 | +15 through +31 | +21 | 111 |
| 22, 21, 20, 19 | +7 through +13 | +9 | 110 |
| 18, 17 | +3 through +5 | +3 | 101 |
| 16 | +1 | +1 | 100 |
| 15 | −1 | −1 | 011 |
| 14, 13 | −3 through −5 | −3 | 010 |
| 12, 11, 10, 9 | −7 through −13 | −9 | 001 |
| 8, 5, 1, 0 | − | | |

The demodulation of the differential pulse code modulation signal that is received may be performed by integrating a nominal 31-bit sequence at 310 kbps for each received differential pulse code modulation word. That is, the clock in the receiver operates at C equal 310 KHz, and the 3-bit transmitted word is transferred from the shift register 18 to the holding register 20 at a bit rate of three thirty-firsts C. The look-up table 21 transmits an arbitrary pre-assigned 31-bit word to the shift register 22 for integration at the 310 KHz rate. Alternatively, demodulation may be performed in the more conventional manner of integrating an analog level proportional to the size of the step encoded in the transmitted digital pulse code modulation word. Again, a look-up table could be provided to generate the step increments, or a conventional digital-to-analog converter could be used to generate an output pulse of proper size at the transmitted word rate.

It will be observed that for the type of system discussed above wherein a plurality of count subsets are assigned to a particular binary code transmission word, there is a likelihood of some long-term error taking place. For example, if the count subsets were assigned as in Table 1 above, and there were a plurality of count subsets wherein 29 ONES occurred, the successive transmission of the code for count subset 26 would cause an error unless corrected. The modification of FIG. 2 for the transmitter is designed to correct this type of long-term encoding error. It should be recognized, however, that while the correction described below is required to produce differential pulse code modulation in such systems, uncorrected systems produce an unnamed output of lesser quality but are nevertheless useful for speech transmission.

Figures 2, 3:
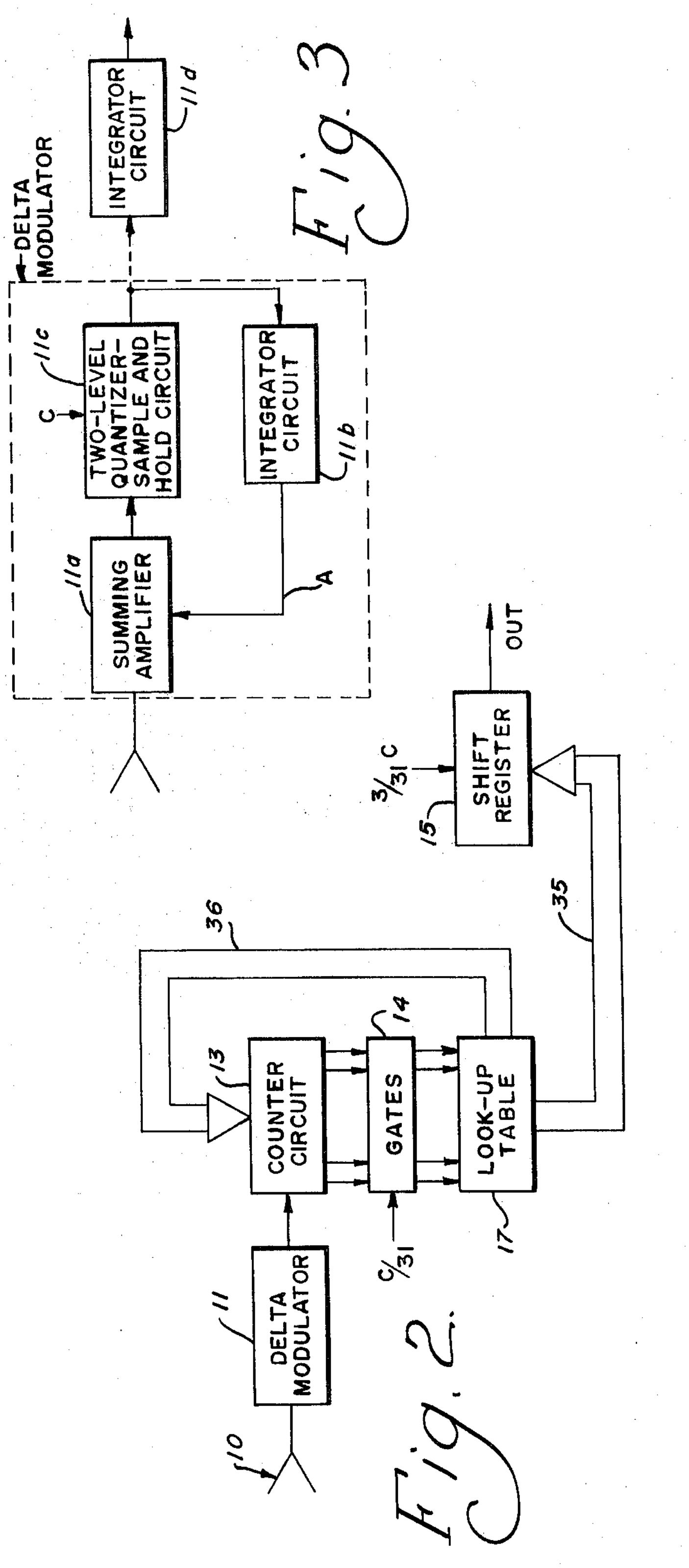
FIG. 2 is a functional block diagram of an alternative transmitter that may be used to practice the invention.
FIG. 3 is a functional block diagram of a simple delta modulator and demodulator system.

Turning then to FIG. 2, the incoming analog signal is again coupled to the input terminal 10 and fed to a delta modulator 11 sampling at a clock rate C. The delta modulator may be the same as the type shown in FIG. 1 and discussed above, and it feeds a counter-circuit 13 similar to the previous counter-circuit 13. The output of the counter-circuit 13 is shifted at the end of a 31 count through gates 14 to a look-up table 15. The look-up table 15 generates the output code representative of the particular count subset transferred from the counter-circuit 13. This output code is transmitted along parallel bus 35 to an output shift register 15, and the output code is transmitted to a digital channel at a bit rate three thirty-firsts C.

At the same time, the look-up table 15 generates a binary code representative of the net counts which were not transmitted, and this binary code or "correction" word is transmitted along the parallel bus 36 and loaded into the counter-circuit 13, thereby presetting the counter 13 in accordance with the difference between the actual count detected and the nominal count that was transmitted. This presetting of counter 13 occurs immediately after it is reset and prior to counting the next incoming set of data from the delta modulator 11. For example, if the first count subset is 28 (representing a net change of +25), the look-up table 15 generates a first binary code word representative of the net change 21 (the code 111) and loads it into the shift register 15 via the bus 35 for transmission. At the same time, the look-up table 15 generates a count equal to two (that is, 28 minus the count subset 26 which represents a net change of 21), and loads it via the bus 36 into the counter-circuit 13. By thus storing a remainder in the counter-circuit 13 to which the next count subset will be added, the long term error will be reduced to zero.

It will be observed that the number of counts in a particular set may be less than the net change value which is transmitted—that is, the level of differential pulse code modulation to which a particular output code is assigned. Thus, it is advisable to have the capability in counter-circuit 13 to handle the negative counts. This may be accomplished according to any number of well-known techniques. One such technique that is used in adder circuits is to include an extra bit in the counter-circuit—a bit in the most significant digit location which is a ONE for positive counts. Thus, in the case of a count subset having 31 incoming bits, the counter-circuit 36 would have six digits and zero would be represented by 100000. The system would then have the capability of counting upward to 31 and yet the counter-circuit could be decremented by the look-up table 15 prior to counting the next subset. A negative remainder of −3 for example would be stored as 011101.

Having thus described in detail preferred embodiments of the present invention, persons skilled in the art will be able to modify certain of the structure which has been disclosed and to substitute equivalent elements for those which have been illustrated while continuing to practice the principle of the invention; and it is, therefore, intended that all such modifications and substitutions be covered as they are embraced within the spirit and scope of the appended claims.

I claim:

1. A system for companded differential pulse code modulation of an analog signal comprising: delta modulator means receiving said analog signal and generating a stream of output binary signals, each bit in said stream representative respectively of whether the input analog voltage at a given sampling time is greater than or less than the predicted value of said analog voltage; first circuit means receiving said stream of bits from said delta modulator means for generating signals comprising a count word representative of the number of binary ONE signals in a set of a predetermined number of bits from said delta modulator; second circuit means including look up circuit means communicating with said first circuit means for generating output binary signals comprising a transmission word for each corresponding count word and having a lesser number of bits than its corresponding count word, at least some of said transmission words representing a predetermined nominal count of ONE signals for a predetermined group of different count words as determined by said look-up circuit means; means for transmitting said transmission words to a digital channel in sequence, said second circuit means further generating signals comprising a binary correction word for each transmission word said binary correction word comprising signals representative of the difference between the actual number of ONE counts in each count word and the nominal ONE count of the corresponding transmission word signal transmitted to said digital channel; and third circuit means receiving said correction word from said look-up circuit means for presetting the count of ONES in said first circuit means to a value representative of the difference between the actual count of the previous count word and the nominal count of the associated transmission word prior to generating a subsequent count word whereby a subsequent transmission word is corrected in accordance with said difference.

* * * * *

UNITED STATES PATENT OFFICE
CERTIFICATE OF CORRECTION

Patent No. 3,763,433 Dated October 2, 1973

Inventor(s) David C. Nicholas

It is certified that error appears in the above-identified patent and that said Letters Patent are hereby corrected as shown below:

Please correct the table in columns 9 and 10 as shown below:

| Count Subsets | Change Range | Net Change | Output Code |
|---|---|---|---|
| 31, ... 26, ... 23 | +15 through +31 | +21 | 111 |
| 22, 21, 20, 19 | +7 through +13 | +9 | 110 |
| 18, 17 | +3 through +5 | +3 | 101 |
| 16 | +1 | +1 | 100 |
| 15 | -1 | -1 | 011 |
| 14, 13 | -3 through -5 | -3 | 010 |
| 12, 11, 10, 9 | -7 through -13 | -9 | 001 |
| 8, ..., 5, ... 1, 0 | -15 through -31 | -21 | 000 |

Signed and sealed this 16th day of April 1974.

(SEAL)
Attest:

EDWARD M.FLETCHER,JR.
Attesting Officer

C. MARSHALL DANN
Commissioner of Patent

FORM PO-1050 (10-69)

USCOMM-DC 60376-P69
☆ U.S. GOVERNMENT PRINTING OFFICE : 1969 O—366-334